May 8, 1928.
P. C. CULLEN
1,668,949
LUBRICATING CHAMBER FOR WATER CUT-OFF VALVES
Filed June 28, 1927
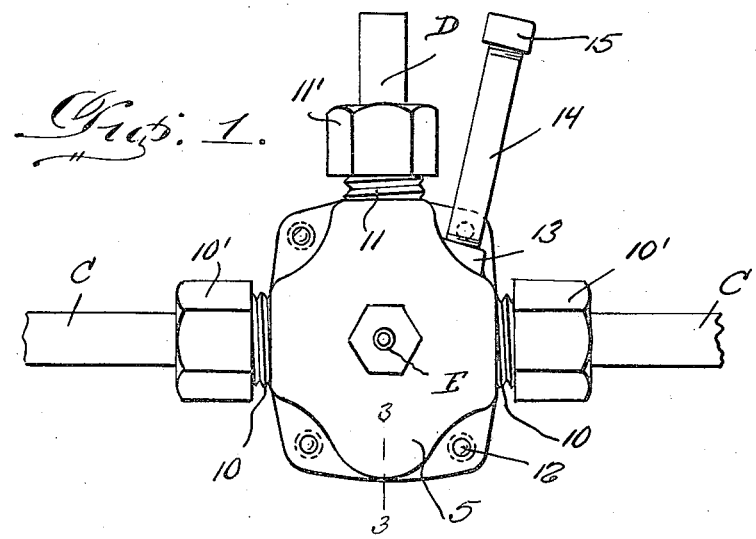
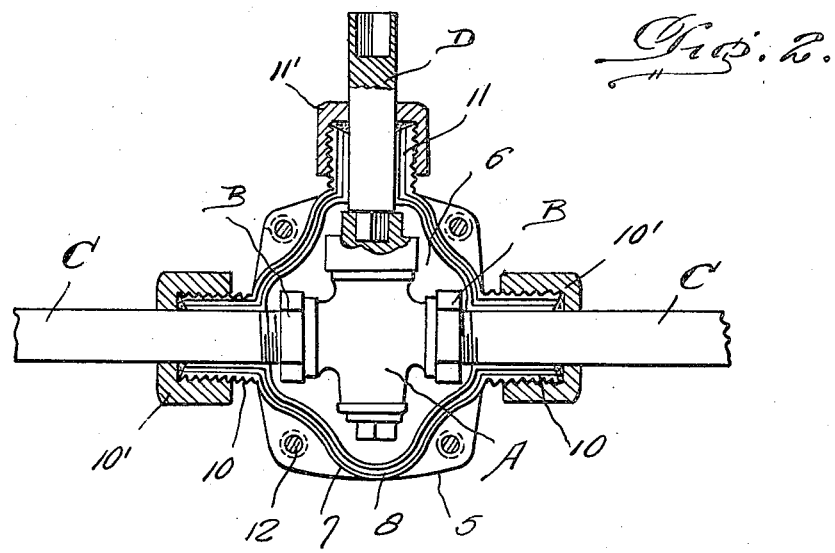
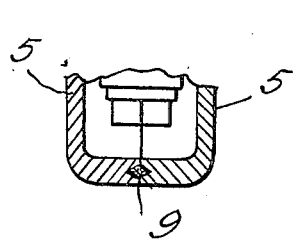
Inventor
P. C. Cullen,
By Clarence A. O'Brien
Attorney Patented May 8, 1928.

1,668,949

UNITED STATES PATENT OFFICE.

PATRICK C. CULLEN, OF DALLAS, TEXAS.

LUBRICATING CHAMBER FOR WATER-CUT-OFF VALVES.

Application filed June 28, 1927. Serial No. 202,049.

This invention relates generally to improvements in valves and has more particular reference to a lubricating casing for water cut off valves, the invention aiming to provide means whereby a water cut off valve may be constantly lubricated exteriorly to prevent the corrosion thereof, which will cause the valve to stick, making it very difficult and sometimes impossible to turn the same.

The invention has for an added purpose means to prevent the freezing of the water at the valve.

It is well known that water cut off valves that stand for a long time without turning, corrode, and after corrosion has set in it is difficult and frequently impossible to turn the same. By reason of my improved device the valve will be maintained lubricated by having the entire valve floating in oil permanently.

One of the most important objects of this invention is to provide a lubricant carrying casing for generally conventional water cut off valves that may be easily applied to or removed from the valves without requiring the detachment of the same from the line, and without in any manner impairing the efficient operation of the valve.

In the drawing wherein like reference characters indicate corresponding parts throughout the several views:

Figure 1 is a side elevation of my improved lubricating casing as actually associated with a conventional water cut off valve.

Figure 2 is a plan view of the valve disclosing one of the casing sections as associated therewith, and Figure 3 is a fragmentary section through the casing for disclosing the packing joint between the sections.

Now having particular reference to the drawing, A designates a conventional water cut off valve having at its sides inlet and discharge pipe fittings B—B to which are attached the inlet and discharge pipes C—C. Furthermore the valve is equipped with a core operable by a turning stem D.

My improved invention consists of a pair of plate-like sections of generally identical construction and being designated by the reference characters 5—5. Each section is formed within its edges with a pocket 6 that when the plates are arranged over the valves the valve will be entirely enclosed thereby. Furthermore, the inner face of each plate is formed with a rib 7 that will extend around the valve A, each rib being formed with a channel 8, to permit a suitable packing 9 to be arranged therebetween when the sections are disposed upon opposite sides of the valve A and to prevent oil from escaping between said rib 7.

Each section of the casing is further formed to provided at its side edges and upper edge radiating semi-circular nipple sections 10—10 and 11 that communicate at their inner ends with said pocket 6 and that extend beyond the edges of the section. Furthermore, the rib 7 of each section is coextensive with the edges of said nipple sections, which edges are formed with channels that are a continuation of the channels within said ribs.

The nipple sections of each casing section 5 are externally threaded so that when the sections are arranged over the valve, cap nuts 10'—10' and 11' may be threaded thereon, said nuts being formed with openings to permit the pipes C—C and the turning stem C of the valve core stem to project therethrough.

The rib 7 of each casing section is of such contour as to extend inwardly of the four corners of said sections so that when the sections are arranged upon the valve, the corners of the casing section will have contact with each other.

All of the corners of the sections are formed with openings so that the sections may be rigidly joined by bolt and nut connections or other suitable fastening means 12.

Inwardly of one of the uppermost corners of one of the sections 5 is formed with internally threaded nipple 13 that has communication with its respective pocket 6, while threaded within this nipple is a vertically extending filler pipe 14 upon the upper end of which is detachably arranged a closure cap 15. This pipe is obviously for the purpose of permitting the casing to be filled with oil with the obvious result that the valve A will be within a permanent oil bath so that there will be no liability of the valve becoming corroded which would prevent the proper turning of the valve core. One of the sections 6 of the casing is formed centrally with an opening through which extends the usual drain nipple E of the valve A, a suitable packing being provided between the nipple and section opening as generally suggested in Figure 1.

It will thus be seen that I have provided a highly novel, simple and useful lubricating casing for water cut off valves that is well adapted for all the purposes heretofore designated and even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a lubricating casing for water cut off valves of the character including a casing having a rotary core therein, and a stem for turning said core and further including inlet and discharge pipe fittings, a pair of plate-like casing sections, each section being pocketed centrally to permit the sections to be disposed over said valve, semi-circular nipple sections arranged at the side and upper edges of each section for engagement over the valve inlet and discharge pipe and said core stem respectively, said nipple sections communicating with the section pockets, cap nuts for engagement over the complementary nipple sections of the casing sections when said casing sections are arranged over the valve, and means whereby a supply of oil may be injected into the sections when the same are arranged upon said valve.

2. In a lubricating casing for water cut off valves, a pair of complemental plate-like sections constructed for disposition upon opposite sides of the valve, means associated with each section to permit the valve inlet and discharge pipes as well as the core stem to project through the casing when said sections are arranged upon the valve, means for rigidly securing the sections together in position over said valve, and means whereby a supply of oil may be injected into the casing formed by said sections.

3. In a lubricating casing for water cut off valves, a pair of complemental plate-like sections constructed for disposition upon opposite sides of the valve, means associated with each section to permit the valve inlet and discharge pipes as well as the core stem to project through the casing when said sections are arranged upon the valve, means for rigidly securing the sections together in position over said valve, means whereby a supply of oil may be injected into the casing formed by said sections, and means associated with the opposed faces of said sections whereby a leak-proof joint may be provided around said valve, said inlet and discharge pipes and said core turning stem.

In testimony whereof I affix my signature.

PATRICK C. CULLEN.